United States Patent
Vidra et al.

(10) Patent No.: US 11,053,595 B2
(45) Date of Patent: Jul. 6, 2021

(54) COBALT CHROME ETCHING PROCESS

(71) Applicants: Michael Vidra, Export, PA (US);
Daniel Jon Schutzer, Irwin, PA (US)

(72) Inventors: Michael Vidra, Export, PA (US);
Daniel Jon Schutzer, Irwin, PA (US)

(73) Assignee: Tech Met, Inc., Glassport, PA (US)

( * ) Notice: Subject to any disclaimer, the term of this patent is extended or adjusted under 35 U.S.C. 154(b) by 0 days.

(21) Appl. No.: 16/715,530

(22) Filed: Dec. 16, 2019

(65) Prior Publication Data
US 2020/0190671 A1    Jun. 18, 2020

Related U.S. Application Data

(60) Provisional application No. 62/779,545, filed on Dec. 14, 2018, provisional application No. 62/892,744, filed on Aug. 28, 2019.

(51) Int. Cl.
| | | |
|---|---|---|
| *C09K 13/04* | (2006.01) | |
| *C09K 13/08* | (2006.01) | |
| *C09K 13/12* | (2006.01) | |
| *C23F 1/16* | (2006.01) | |
| *C23F 1/28* | (2006.01) | |

(52) U.S. Cl.
CPC ........... *C23F 1/28* (2013.01); *C09K 13/08* (2013.01); *C09K 13/12* (2013.01)

(58) Field of Classification Search
CPC ........ C09K 13/04; C09K 13/08; C09K 13/12; C23F 1/16
See application file for complete search history.

(56) References Cited

U.S. PATENT DOCUMENTS

| | | | |
|---|---|---|---|
| 4,376,057 A | 3/1983 | Angelo et al. | |
| 5,922,029 A | 7/1999 | Wagner et al. | |
| 5,944,909 A | 8/1999 | Reeves et al. | |
| 8,764,864 B1* | 7/2014 | Miess | B24D 3/06 51/307 |
| 2006/0085062 A1* | 4/2006 | Lee | A61L 31/146 623/1.39 |

(Continued)

OTHER PUBLICATIONS

Arcam-ASTM-F75-Cobalt-Chrome, Website, No date.*

(Continued)

*Primary Examiner* — Thomas T Pham
(74) *Attorney, Agent, or Firm* — Dentons Cohen & Grigsby P.C.

(57) ABSTRACT

Compositions and methods for etching cobalt chromium alloys are disclosed. The compositions generally include at least two mineral acids, certain component metals of the alloy to be etched, and optionally iron (Fe). For example, when etching a cobalt chromium molybdenum alloy, the metals may include chromium (Cr), molybdenum (Mo), and optionally, cobalt (Co). The at least two mineral acids may include hydrochloric acid (HCl), nitric acid (HNO₃), and hydrofluoric acid (HF). The methods provide for etching an entire surface of a substrate or etching a surface of a substrate in a pattern using selective coating patterns and/or coating removal. Thus, unlimited patterns, as well as etch depths and variations in etch depths are achievable using the compositions and methods disclosed.

20 Claims, 2 Drawing Sheets

(56) References Cited

U.S. PATENT DOCUMENTS

2009/0008365 A1* 1/2009 Tong .................. C23F 1/26
                                                    216/108
2015/0352515 A1* 12/2015 Redmond ............. B24D 18/00
                                                    51/309
2016/0208114 A1* 7/2016 Hendricks ............ C09D 5/4476

OTHER PUBLICATIONS

EWP_Chemical Composition for Austenitic Stainless Steels used in Piping applications, Website, No date.*
Arnholt et al., "What is the incidence of Cobalt-Chromium Damage Modes on the Bearing Surface of Contemporary Femoral Component Designs for Total Knee Anthroplasty?", Oct. 2018 [Retrieved Feb. 21, 2020] Retrieved from Internet URL: <https://www.ncbi.nlm.nih.gov/pmc/articles/PMC6146069/pdf/nihms972615.pdf>.

* cited by examiner

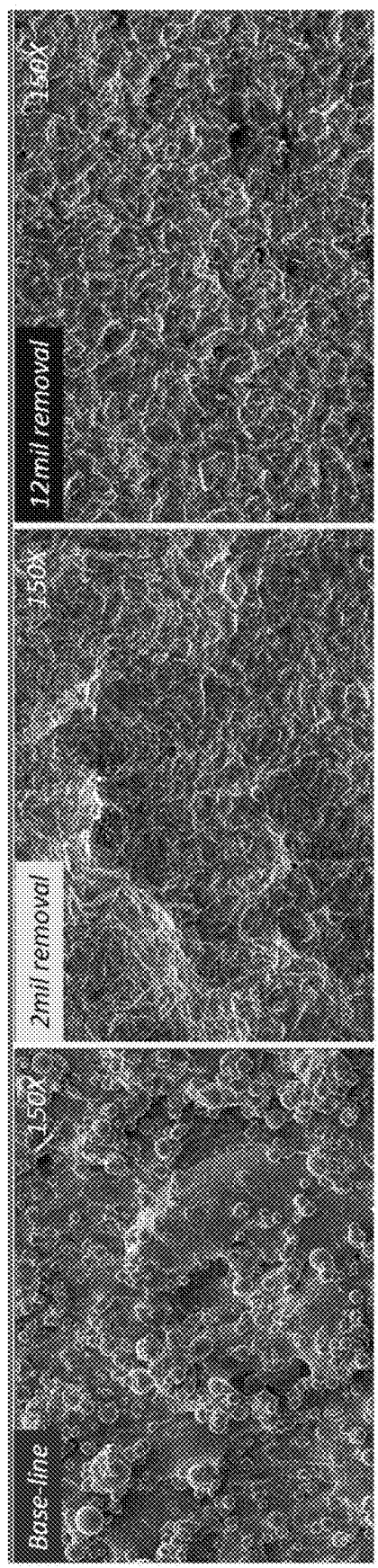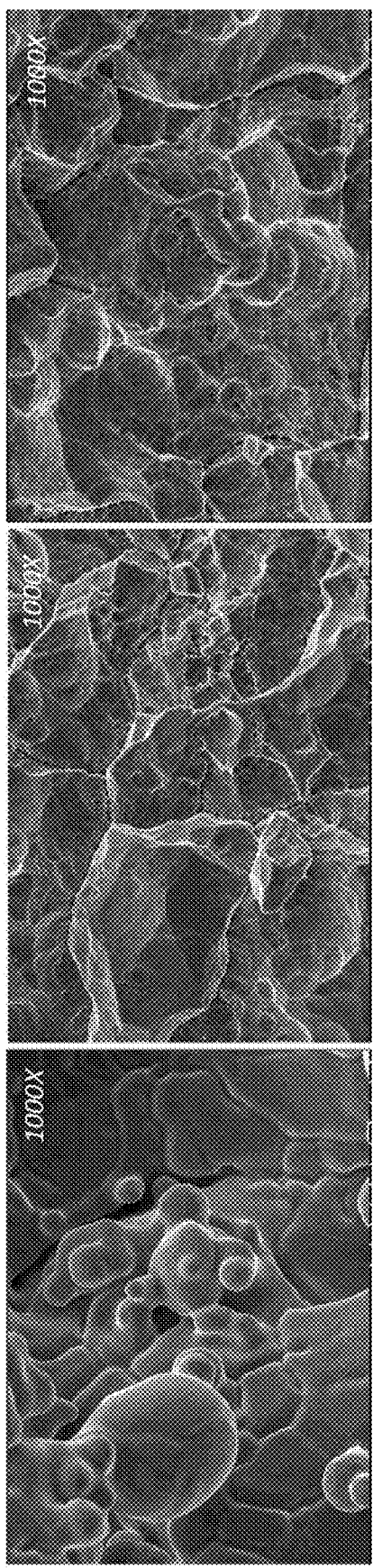
FIG. 1A  FIG. 1B
FIG. 1C  FIG. 1D
FIG. 1E  FIG. 1F

COBALT CHROME ETCHING PROCESS

RELATED APPLICATIONS

This application claims priority to U.S. Provisional Patent Application No. 62/779,545 filed Dec. 14, 2018, and U.S. Provisional Patent Application No. 62/892,744 filed Aug. 28, 2019, both of which are incorporated herein by reference in their entirety.

TECHNICAL FIELD

This invention pertains generally to compositions for the controlled etching of cobalt chromium-based alloys and methods of use thereof to etch cobalt chromes.

BACKGROUND

Cobalt chromium alloys, commonly referred to as Cobalt-Chrome (CoCr), are generally corrosion resistant and extremely hard. These outstanding properties result from the crystallographic nature of cobalt, the strengthening effect of chromium and other alloying elements, the formation of extremely hard carbides, and the corrosion resistance imparted by chromium. These qualities make CoCr alloys desirable in industrial, medical and technical fields. It also makes the alloys very difficult to chemically mill or chemically machine, by which we mean to intentionally corrode or etch the material in a predictable and controlled manner.

In several fields where CoCr is used, it is desirable to obtain as smooth a surface condition as practical, without excessive removal of material. This is particularly true with respect to aerospace applications, where the target is to prepare a surface for dye penetrant or other inspections, to improve air flow patterns and characteristics, and to improve long term fatigue performance.

Abrasive flow smoothing or machining has historically been used for smoothing of cobalt chromium alloys. In such a process, a highly viscous fluid comprising an abrasive material is forced over surfaces and through internal passageways of a work-piece to polish those surfaces and passageways. The viscosity of the fluid, and often highly intricate system of piping connections needed to direct the fluid through the passageways of the work-piece make this process slow and expensive. Moreover, every unique work-piece typically requires a uniquely designed system of piping connections, adding to the expense of the process.

Certain chemistries have been shown to provide a relatively smooth surface while only removing small amounts of material through chemical attack, most notably, a mixture of concentrated hydrogen peroxide and concentrated hydrochloric acid. These methods are suitable only for superficial removal of material as the mixture is volatile, depletes quickly, and suffers from aggressive metal-ion driven decomposition of the peroxide. Further, this solution commonly results in significant intergranular attack (IGA) of the CoCr materials.

Accordingly, a controlled means of reliably and predictably removing material from CoCr alloys through chemical machining is desired, and would find application in several different fields, including medical, aerospace, and specialty industrial. Moreover, means to remove material from CoCr alloys in order to impart a particular surface roughness or microscopic surface profile for enhanced or accelerated bio-integration, or a particular surface smoothness for aerospace applications that may improve air flow patterns and characteristics and enhance dye penetrant or other inspections, is desired. Means to remove material from CoCr alloys in order to reduce weight of a part, remove 3D printed support structures, and improve long term fatigue performance, among other applications is also desired.

SUMMARY

To meet this and other needs, the present invention provides compositions useful for controlled chemical etching of cobalt chromium alloys, and methods of their use to provide surfaces having finely tunable characteristics, such as smooth surfaces useful in the aerospace industry.

The presently disclosed invention includes a composition for etching a cobalt chromium alloy, wherein the composition comprises at least two mineral acids, iron (Fe), and low concentrations of certain component metals of the alloy to be etched. For example, when etching a cobalt chromium molybdenum alloy, the metals may include chromium (Cr), molybdenum (Mo), and optionally, cobalt (Co). According to certain aspects, the composition may comprise 50-225 g/l iron (Fe), 1-10 g/l chromium (Cr), 0.1-5 g/l molybdenum (Mo), and 0 to 10 g/l cobalt (Co).

The presently disclosed invention also includes a composition for etching a cobalt chromium alloy, wherein the composition comprises at least two mineral acids, and high concentrations of component metals of the alloy to be etched. For example, when etching a cobalt chromium molybdenum alloy, the metals may include cobalt (Co), chromium (Cr), and molybdenum (Mo). Exemplary amounts of such metals in the composition include 7 to 355 g/l cobalt (Co), 3-170 g/l chromium (Cr), and 1-40 g/l molybdenum (Mo). According to certain aspects, the component metals may be included in amounts that mimic the ratio they are included in the metal alloy (i.e., the native ratio of metals in the alloy). For example, when the alloy is a cobalt chromium molybdenum alloy, the component metals may be provided at about 63-68 wt. % Co, 27-30 wt. % Cr, and 5-7 wt. % Mo, based on the total weight of the alloy.

According to certain aspects, the at least two mineral acids may be selected from hydrochloric acid (HCl), nitric acid ($HNO_3$), sulfuric acid ($H_2SO_4$), iodic acid ($HIO_3$), and hydrofluoric acid (HF). According to certain aspects, the at least two mineral acids may comprise hydrochloric acid (HCl), nitric acid ($HNO_3$), and hydrofluoric acid (HF).

According to certain aspects, the composition may comprise 2N to 5N hydrochloric acid (HCl), 0.05N to 0.8N nitric acid ($HNO_3$), and 0.6N to 1.3N hydrofluoric acid (HF). According to certain aspects, the composition may be an aqueous solution.

According to certain aspects of the present invention, the alloy material may be etched on one or more surfaces by contacting the work-piece with any of the chemical etching compositions disclosed herein. Before the work-piece can be etched with the chemical etching compositions of the presently disclosed invention, the work-piece may require an activation step. An exemplary activation step includes exposing the surface of the work-piece that is to be etched to a mineral acid such as a 10% to 100% solution of concentrated hydrochloric acid (v/v; dilution with an aqueous buffer or water). The surface may be exposed to the mineral acid at a range of temperatures, such as room temperature, wherein higher temperatures require lower concentrations of the mineral acid. The alloy material may be exposed to the mineral acid by submersion or spraying.

Immediately after activation, such as within 30 seconds, the work-piece may be exposed to the chemical etching compositions as described herein below. According to certain aspects, the work-piece may still be "wet" with the activation solution (i.e., mineral acid such as the 10%-100% dilution of hydrochloric acid).

After the surface of the work-piece is activated, it may be etched by contact with the chemical etching compositions, which may include dipping or submersing the work-piece in the composition, or spraying, rolling, or brushing the composition onto one or more surfaces of the work-piece.

Thus, the presently disclosed invention also includes methods for etching an alloy material According to certain aspects, one method may include preparing one of the chemical etching compositions described above, activating the alloy material (e.g., a work-piece) with a mineral acid, and contacting the alloy material with the chemical etching composition. According to certain aspects, the step of contacting with the chemical etching composition may be carried out immediately after the activation step, such as before the alloy material dries (i.e., from exposure to the mineral acid), or within 30 seconds after exposure to the mineral acid.

According to certain aspects, the alloy material may be contacted with the chemical etching composition at a temperature of from about 20° C. to about 100° C., such as from about 30° C. to about 100° C., or from about 40° C. to about 100° C., or from about 50° C. to about 100° C., or from about 60° C. to about 100° C. According to yet further aspects, the alloy material may be contacted with the chemical etching composition at a temperature of from about 65° C. to about 95° C., such as from about 80° C. to about 95° C., such as from about 82° C. to about 88° C., or from about 88° C. to about 91° C. Further, the alloy material may be agitated in the chemical etching composition. Further yet, the alloy material may be contacted with the chemical etching composition for an unlimited time period based on the desired depth of etch, such as preferably from 5 to 50 minutes, such as from 20 to 35 minutes.

According to certain aspects of the present invention, another method for etching an alloy material may include contacting at least one surface of a work-piece with a chemical etching composition. The alloy material may be agitated during contact with the chemical etching composition. The chemical etching composition, and the times and temperatures used for exposure of the alloy material to the chemical etching composition may be as disclosed hereinabove.

The presently disclosed invention further includes methods for etching a patterned design in a metal alloy. The method may comprise applying a coating which resists chemical etchants to at least a portion of the metal alloy, removing a portion of the coating to form a patterned design in the coating, and applying a chemical etching composition. The chemical etching composition, and the times and temperatures used for exposure of the alloy material to the chemical etching composition may be as disclosed hereinabove. Moreover, prior to etching, the alloy material may be activated as described hereinabove, such as before etching, or even before application of the coating material (i.e., before patterning).

The method may further comprise stripping the coating from the metal alloy after the patterned etching is complete. The metal alloy may form all or a portion of a work-piece, including parts of the work-piece or a coating thereon.

According to certain aspects, the metal alloy to be etched by the compositions or methods disclosed herein may be a cobalt chromium alloy such as, for example, a cobalt chromium molybdenum alloy, cobalt chromium tungsten nickel alloy, or a cobalt nickel chromium molybdenum alloy.

BRIEF DESCRIPTION OF THE DRAWINGS

FIGS. 1A-1F show micrographs of cobalt-chromium alloy surfaces, where FIGS. 1A and 1B are 150× and 1000× magnifications, respectively, of a native alloy surface; FIGS. 1C and 1D are 150× and 1000× magnifications, respectively, of a surface etched to 2 mil (50 micron) depth using etch compositions in accordance with certain aspects of the presently disclosed invention; and FIGS. 1E and 1F are 150× and 1000× magnifications, respectively, of a surface etched to 12 mil (300 micron) depth using etch compositions in accordance with certain aspects of the presently disclosed invention.

Figure 2A:
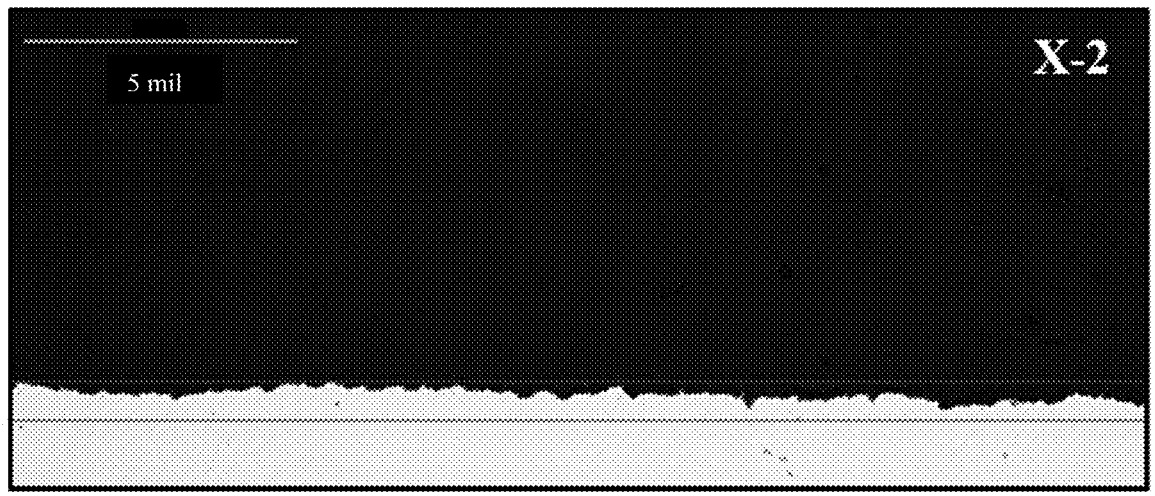

2A-2C show micrographs of a cross-section of a cobalt-chromium-molybdenum alloy surface etched with various chemistries according to certain aspects of the presently disclosed invention, with a 5 mil (127 micron) scale bar.

DETAILED DESCRIPTION

In the following description, the present invention is set forth in the context of various alternative embodiments and implementations involving chemical compositions for the selective removal of surface materials from a cobalt chrome alloy (i.e., chemical etching compositions), and methods of use thereof.

Various aspects of the chemical etching compositions and methods disclosed herein may be illustrated by describing components that are coupled, attached, and/or joined together. As used herein, the terms "coupled", "attached", and/or "joined" are interchangeably recited to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the chemical etching compositions and methods disclosed herein may be described and illustrated with reference to one or more exemplary implementations. As used herein, the term "exemplary" means "serving as an example, instance, or illustration," and should not necessarily be construed as preferred or advantageous over other variations of the compositions or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

It must also be noted that as used herein and in the appended claims, the singular forms "a", "an", and "the" include the plural reference unless the context clearly dictates otherwise. Thus, reference to "a" composition, "an" alloy, or "the" metal, may be a reference to one or more of these or any other component as disclosed herein.

Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

"Substantially free", as used herein, is understood to mean inclusive of only trace amounts of a constituent. "Trace amounts" are those quantitative levels of a constituent that are barely detectable and provide no benefit to the functional properties of the subject composition, process, or articles formed therefrom. For example, a trace amount may constitute 1.0 wt. %, 0.5 wt. %, 0.1 wt. %, 0.05 wt. %, or even 0.01 wt. % of a component or constituent of any of the alkaline chemistries disclosed herein. "Totally free", as used herein, is understood to mean completely free of a component or constituent.

Unless defined otherwise, all technical and scientific terms used herein have the same meanings as commonly understood by one of ordinary skill in the art.

The chemical etching compositions disclosed herein provide a means for performing a subtractive process on a substrate, i.e., chemical etching, also referred to as chemical machining or milling. Chemical etching may comprise, for example, exposure of select surfaces of an object or work-piece, or the entire work-piece, to the chemical etching compositions disclosed herein for a period of time sufficient to remove a portion of the surface to a desired depth.

Chemical Etching Compositions

According to aspects of the present invention, the chemical etching composition includes at least two mineral acids. A mineral acid is an inorganic acid derived from one or more inorganic compounds. All mineral acids release hydrogen ions when dissolved in water. Suitable examples of mineral acids include, but are not limited to, hydrochloric acid (HCl), nitric acid ($HNO_3$), phosphoric acid ($H_3PO_4$), sulfuric acid ($H_2SO_4$), hydrofluoric acid (HF), iodic acid ($HIO_3$), and hydrobromic acid (HBr).

According to certain aspects of the present invention, the at least two mineral acids in the chemical etching composition are selected from hydrochloric acid (HCl), nitric acid ($HNO_3$), sulfuric acid ($H_2SO_4$), iodic acid ($HIO_3$), and hydrofluoric acid (HF). According to certain aspects, the chemical etching composition comprises hydrochloric acid (HCl), nitric acid ($HNO_3$), and hydrofluoric acid (HF).

According to certain other aspects, the chemical etching composition comprises 2N to 5N hydrochloric acid (HCl), 0.05N to 0.8N nitric acid ($HNO_3$), and 0.6N to 1.3N hydrofluoric acid (HF). According to certain other aspects, the chemical etching composition comprises 3N to 5N HCl, or 4N to 5N HCl; 0.05N to 0.6N $HNO_3$, or 0.05N to 0.4N $HNO_3$, or 0.05N to 0.2N $HNO_3$, or 0.2N to 0.8N $HNO_3$, or 0.3N to 0.7N $HNO_3$, or 0.4N to 0.6N $HNO_3$; and 0.7N to 1.2N HF, or 0.8N to 1.1N HF, or 0.7N to 1.0N HF.

According to certain other aspects, the chemical etching composition comprises at least 2N hydrochloric acid (HCl), such as at least 2.2N, or at least 2.4N, or at least 2.6N, or at least 2.8N, or at least 3N, or at least 3.2N, or at least 3.4N, or at least 3.6N, or at least 3.8N, or at least 4.0N. According to certain other aspects, the chemical etching composition comprises up to 5N hydrochloric acid (HCl), such as up to 4.9N, or up to 4.8N, or up to 4.7N, or up to 4.6N, or up to 4.5N, or up to 4.4N, or up to 4.3N, or up to 4.2N, or up to 4.1N, or up to 4.0N.

According to certain other aspects, the chemical etching composition comprises at least 0.05N nitric acid ($HNO_3$), such as at least 0.1N, or at least 0.2N, or at least 0.3N, or at least 0.4N, or at least 0.5N, or at least 0.6N, or at least 0.7N. According to certain other aspects, the chemical etching composition comprises up to 0.8 nitric acid ($HNO_3$), such as up to 0.7N, or up to 0.6N, or up to 0.5N, or up to 0.4N, or up to 0.3N, or up to 0.2N, or up to 0.1N.

According to certain other aspects, the chemical etching composition comprises at least 0.6N hydrofluoric acid (HF), such as at least 0.7N, or at least 0.8N, or at least 0.9N, or at least 1.0N, or at least 1.1N, or at least 1.2N. According to certain other aspects, the chemical etching composition comprises up to 1.3N hydrofluoric acid (HF), such as up to 1.2N, or up to 1.1N, or up to 1.0N, or up to 0.9N, or up to 0.8N, or up to 0.7N.

According to aspects of the present invention, the chemical etching composition also comprises component metals of the metal alloy to be etched. For example, the chemical etching composition may comprise chromium (Cr) and molybdenum (Mo) for use in etching a cobalt chrome work-piece formed from a cobalt chromium molybdenum alloy such as ASTM F75, F799, or F1357. As additional examples, the chemical etching composition may comprise chromium (Cr), molybdenum (Mo), and nickel (Ni) for use in etching a cobalt chrome work-piece formed from a cobalt nickel chromium molybdenum alloy such as ASTM F562, or chromium (Cr), nickel (Ni), and tungsten (W) for use in etching a cobalt chrome work-piece formed from a cobalt chromium tungsten nickel alloy such as ASTM F90.

According to aspects of the present invention, the chemical etching composition may optionally comprise cobalt (Co).

According to aspects of the present invention, the chemical etching composition may further comprise iron (Fe). Without being tied to one theory, it is believed that the addition of iron to the chemical etching composition may help to stabilize the reaction rate of the composition.

The present inventors have discovered that for a composition where all acids are within the concentration ranges previously discussed, and the component metals chromium and molybdenum are present, with or without the presence of cobalt and/or iron, the surface of the processed parts improves (gets smoother, i.e., the surface roughness, or $R_a$, decreases) with increased metals content.

Without being tied to one theory, the increased metals content may improve the surface finish (smoothness) regardless of the metals used to raise the metals content, but the level of improvement has been found to depend on the types and ratios of the metals used. That is, increasing the concentration of metals primarily by increasing the iron content shows surface roughness improvement, but the surface is improved further by increasing the content of the component metals (e.g., chromium, molybdenum, and cobalt) while leaving iron content low or absent.

Thus, according to a first embodiment of the presently disclosed invention, the chemical etching composition may comprise at least two mineral acids, iron, and low to moderate concentrations of certain component metals of the alloy to be etched. For example, the composition may comprise any two or more of the mineral acids listed herein, and 50-225 g/l iron (Fe), 1-10 g/l chromium (Cr), 0.1-5 g/l molybdenum (Mo), and optionally cobalt (Co), such as 0 to 10 g/l cobalt (Co) when the alloy to be etched is a cobalt chromium molybdenum alloy.

According to certain other aspects of the first embodiment, the chemical etching composition comprises at least 50 g/l iron (Fe), or at least 70 g/l, or at least 90 g/l, or at least 110 g/l, or at least 130 g/l, or at least 150 g/l, or at least 170 g/l, or at least 200 g/l. According to certain other aspects, the chemical etching composition comprises up to 225 g/l iron (Fe), such as up to 200 g/l, or up to 160 g/l, or up to 140 g/l, or up to 120 g/l, or up to 100 g/l, or up to 80 g/l, or up to 60 g/l.

According to certain other aspects of the first embodiment, the chemical etching composition comprises at least 1 g/l chromium (Cr), or at least 2 g/l, or at least 3 g/l, or at least 4 g/l, or at least 5 g/l, or at least 6 g/l, or at least 7 g/l, or at least 8 g/l, or at least 9 g/l. According to certain other aspects, the chemical etching composition comprises up to 10 g/l Chromium (Cr), such as up to 9 g/l, or up to 8 g/l, or up to 7 g/l, or up to 6 g/l, or up to 5 g/l, or up to 4 g/l, or up to 3 g/l, or up to 2 g/l.

According to certain other aspects of the first embodiment, the chemical etching composition comprises at least 0.1 g/l molybdenum (Mo), or at least 0.5 g/l, or at least 1 g/l, or at least 2 g/l, or at least 3 g/l, or at least 4 g/l. According to certain other aspects, the chemical etching composition comprises up to 5 g/l molybdenum (Mo), such as up to 4 g/l, or up to 3 g/l, or up to 2 g/l, or up to 1 g/l, or up to 0.5 g/l.

According to certain other aspects of the first embodiment, the chemical etching composition comprises no cobalt (Co), or at least 1 g/l, or at least 2 g/l, or at least 3 g/l, or at least 4 g/l, or at least 5 g/l, or at least 6 g/l, or at least 7 g/l, or at least 8 g/l, or at least 9 g/l. According to certain other aspects, the chemical etching composition comprises up to 10 g/l cobalt (Co), such as up to 9 g/l, or up to 8 g/l, or up to 7 g/l, or up to 6 g/l, or up to 5 g/l, or up to 4 g/l, or up to 3 g/l, or up to 2 g/l.

According to a second embodiment of the presently disclosed invention, the chemical etching composition may comprise at least two mineral acids, and high concentrations of certain component metals of the alloy to be etched. For example, the composition may comprise any two or more of the mineral acids listed herein, and about 7-355 g/l cobalt (Co), about 3-170 g/l chromium (Cr), and about 1-40 g/l molybdenum (Mo) when the alloy to be etched is a cobalt chromium molybdenum alloy. The composition may be substantially free of, or totally free of, iron.

According to certain other aspects of the second embodiment, the chemical etching composition comprises at least 3 g/l chromium (Cr), or at least 10 g/l, or at least 20 g/l, or at least 30 g/l, or at least 40 g/l, or at least 50 g/l, or at least 70 g/l, or at least 90 g/l, or at least 110 g/l, or at least 130 g/l, or at least 150 g/l. According to certain other aspects, the chemical etching composition comprises up to 170 g/l chromium (Cr), such as up to 160 g/l, or up to 150 g/l, or up to 140 g/l, or up to 130 g/l, or up to 120 g/l, or up to 100 g/l, or up to 80 g/l, or up to 60 g/l, or up to 40 g/l. or up to 20 g/l, or up to 10 g/l.

According to certain other aspects of the second embodiment, the chemical etching composition comprises at least 1 g/l molybdenum (Mo), or at least 5 g/l, or at least 10 g/l, or at least 20 g/l, or at least 30 g/l, or at least 35 g/l. According to certain other aspects, the chemical etching composition comprises up to 40 g/l molybdenum (Mo), such as up to 35 g/l, or up to 30 g/l, or up to 20 g/l, or up to 10 g/l, or up to 5 g/l.

According to certain other aspects of the second embodiment, the chemical etching composition comprises at least 7 g/l cobalt (Co), or at least 15 g/l, or at least 50 g/l, or at least 100 g/l, or at least 150 g/l, or at least 200 g/l, or at least 250 g/l, or at least 300 g/l, or at least 325 g/l. According to certain other aspects, the chemical etching composition comprises up to 355 g/l molybdenum (Mo), such as up to 325 g/l, or up to 300 g/l, or up to 250 g/l, or up to 200 g/l, or up to 150 g/l, or up to 100 g/l, or up to 50 g/l, or up to 25 g/l.

According to certain aspects of the second embodiment, the component metals may be included in amounts that mimic the ratio in which they are included in the metal alloy. For example, when the alloy is a cobalt chromium molybdenum alloy, such as ASTM F75, the component metals may be provided as about 63-68 wt. % Co, 27-30 wt. % Cr, and 5-7 wt. % Mo, based on the total weight of the alloy; or when the alloy is a cobalt nickel chromium molybdenum alloy, such as ASTM F562, the component metals may be provided as about 35 wt. % Co, about 35 wt. % Ni, about 20 wt. % Cr, and about 10 wt. % Mo, based on the total weight of the alloy. While certain examples of alloys and their component metal ratios have been provided herein as examples, other alloys of cobalt chrome are within the scope of the presently disclosed invention. One of ordinary skill in the art would know the ratio of the component metals in certain other alloys and be able to understand the rations in which they would be provided according to the description of the invention provided in this disclosure.

The chemical etching composition may be an aqueous composition. As such, the mineral acids and component metals may be dissolved into an aqueous medium, such as water or another aqueous buffer.

According to certain aspects of the present invention, the work-piece may be etched on one or more surfaces by contacting the work-piece with any of the chemical etching compositions disclosed herein. According to certain aspects of the present invention, the alloy material may be etched on one or more surfaces by contacting the alloy with any of the chemical etching compositions disclosed herein.

Surface Activation

Before the work-piece or alloy can be etched with the chemical etching compositions of the presently disclosed invention, the work-piece or alloy may require an activation step. An exemplary activation step includes exposing the surface of the work-piece to be etched to a mineral acid, such as a 10% to 100% (v/v) aqueous solution of the mineral acid. An exemplary activation solution includes a 10% to 100% aqueous solution of concentrated hydrochloric acid or hydrofluoric acid (v/v; dilution with an aqueous buffer or water). The surface may be exposed to the mineral acid at a range of temperatures, such as room temperature or above, wherein higher temperatures require lower concentrations of the mineral acid. The work-piece may be exposed to the mineral acid by submersion or spraying.

According to certain aspects, certain alloys, e.g., wrought and/or forged cobalt chromium alloys, may benefit from activation with a mixture of concentrated hydrogen peroxide (50% $H_2O_2$) and concentrated hydrochloric acid (fuming hydrochloric acid; 37%). For example, according to certain aspects, the activation composition may comprise at least 25% (v/v) hydrogen peroxide and at least 25% concentrated hydrochloric acid. The surface may be exposed to the mixture at a range of temperatures, such as room temperature or above, wherein higher temperatures require lower concentrations of the mineral acid. The work-piece may be exposed to the mixture by submersion or spraying.

As indicated hereinabove, such chemistry is generally only suitable for superficial removal of material. However, as used in the presently disclosed methods, the activation step is not employed to etch the alloy surface but rather to activate the alloy surface for etching with the novel compositions disclosed herein. Moreover, any intergranular attack (IGA) of the CoCr materials that may be incurred by this activation step would be removed by the subsequent more substantial etching compositions and methods that follow the activation step.

Immediately after activation, such as within 120 seconds, the work-piece may be exposed to the chemical etching compositions as described herein below. According to certain aspects, the work-piece may still be "wet" with the activation solution (i.e., mineral acid such as the 10%-100% dilution of hydrochloric acid).

After the surface of the work-piece is activated, it may be etched by contact with the chemical etching compositions, which may include dipping or submersing the work-piece in the composition, or spraying, rolling, or brushing the composition onto one or more surfaces of the work-piece.

Etching Methods

The presently disclosed invention provides methods for etching an alloy material of a work-piece. According to certain aspects, one method may include preparing one of the chemical etching compositions described above, activating the alloy material with a mineral acid or mixture of a mineral acid and hydrogen peroxide, and contacting the alloy material with the chemical etching composition. According to certain aspects, the step of contacting with the chemical etching composition may be carried out immediately after the activation step, such as before the alloy material dries, or within 120 seconds after activation (i.e., 120 seconds from exposure to the mineral acid), or within 90 seconds after activation, or within 60 seconds after activation, or within 30 seconds after activation.

Contacting the work-piece with the chemical etching compositions may include dipping or submersing the work-piece in the composition, or spraying, rolling, or brushing the composition onto one or more surfaces of the work-piece.

For example, the work-piece to be etched may be attached to a fixture resistant to the chemical etch composition and both the work-piece and at least a portion of the fixture may be submerged in the chemical etch composition for a specified time (e.g., the part is suspended over/in the chemical etch composition).

The present inventors have found that it may be preferred to position the surfaces to be etched horizontally, such as facing upward in the composition, or vertically depending on the targeted surface characteristics. The gaseous byproducts of the etch reaction move directly upwards and away from the surface when that surface is etched horizontally, and do not otherwise affect the process. When the surface to be etched is positioned vertically, bubbles may travel along the vertical surface and influence the etch rate through localized microcirculation and its effects on the replenishment of unreacted chemistry to the target surface. In such ways, surface geometry may be manipulated by adjusting the angle of the parts (with respect to horizontal) during processing.

Thus, according to certain aspects of the present invention, the work-piece may be etched on one or more surfaces by positioning the work-piece at an angle within the chemical etching composition. Exemplary angles include 0° with respect to the surface of the "bath" containing the chemical etch composition (i.e., horizontal facing upward), to 90° with respect to the surface of the bath (i.e., vertical), to 180° with respect to the surface of the bath (i.e., horizontal facing downward), or any angle therebetween.

Alternatively, the work-piece may be placed into a drum filled with the chemical etch composition, and the drum may be rotated. Additional substrate, such as inert plastic beads or pieces, may be added to the drum to cushion the parts during rotation.

The chemical etching step may include agitating the work-piece in the chemical etching composition. The chemical etching step may include recirculating the etching composition, wherein the recirculating may include circulation of the original chemical etching composition (i.e., etching composition applied/used at start of method), or circulation of the original chemical etching composition with additional new, unused chemical etching composition. The chemical etching step may include exchange of used chemical etching composition after a certain amount of etch time for new, unused chemical etch composition.

The chemical etching step may further include heating the work-piece and/or the chemical etching composition to a temperature in a range of from about 20° C. to about 100° C., such as from about 30° C. to about 100° C., or from about 40° C. to about 100° C., or from about 50° C. to about 100° C., or from about 60° C. to about 100° C., or from about 65° C. to about 95° C., or from about 80° C. to about 95° C., or from about 82° C. to about 88° C., or from 88° C. to about 91° C. According to certain aspects, the alloy material may be contacted with the chemical etching composition at a temperature in a range of from about 20° C. to about 100° C., such as from about 30° C. to about 100° C., or from about 40° C. to about 100° C., or from about 50° C. to about 100° C., or from about 60° C. to about 100° C., or from about 65° C. to about 95° C., or from about 80° C. to about 95° C., or from about 82° C. to about 88° C., or from 88° C. to about 91° C.

According to certain aspects, the alloy material may be contacted with the chemical etching composition for an unlimited time period based on the desired depth of etch. Etching starts as soon as the alloy material is exposed to the chemical etching composition and may proceed until the desired depth of etching is achieved. As such, the alloy material may be contacted with the chemical etching compositions from greater than 0 seconds to greater than several hours or days. According to certain aspects of the presently disclosed invention, the alloy material may be exposed to, such as agitated within, the chemical etching composition for a time of from 1 to 1000 minutes, such as from 2 to 200 minutes, or from 5 to 50 minutes.

The chemical etching compositions and methods disclosed herein may be used to remove portions or all of a surface of a work-piece to a desired depth. Moreover, the compositions and methods disclosed herein provide removal of the material without significant intergranular attack (IGA).

The compositions and methods disclosed herein also provide means to remove artifacts of manufacture, such as support structures formed during 3D manufacture of the work-piece, or islands left behind during laser manufacture of a work-piece, or to reduce debris from the work-piece surfaces, such as artifacts of the additive manufacturing process, e.g., powder, particles, granules, etc. that were not completely melted or completely sintered during the additive building. Debris may also include external debris such as dirt or other artifacts of handling.

The present inventors have found that the removal of surface material using the compositions and methods disclosed herein are predictable and repeatable, but unlike most other alloys, once the material is removed, the etched surface of the alloy forms an extremely stable passive surface layer that inhibits further etching without a suitable chemical or electrochemical re-activation of the surface, such as the activation step disclosed above, or disruption of the surface layer (e.g., by a mechanical means such as grit-blasting). Because of this, processing is most easily and economically performed with full targeted removal taking place all in one step.

Cobalt Alloys

The compositions and methods disclosed herein are suitable for all types of Cobalt-Chromium-Molybdenum based alloys including cast, forged, machined, and other products with formulations such as, but not limited to, ASTM F75 (Standard Specification for Cobalt-28Chromium-6Molybdenum Alloy Casting and Casting Alloy for Surgical Implants), ASTM F799 (Standard Specification for Cobalt-28Chromium-6Molybdenum Alloy Forgings for Surgical Implants), and ASTM F1537 (Standard Specification for Cobalt-28Chromium-6Molybdenum Alloys for Surgical Implants).

This composition is also suitable for Cobalt-Chromium alloys containing Nickel such as ASTM F90 (Standard Specification for Wrought Cobalt-20Chromium-15Tungsten-10Nickel Alloy for Surgical Implant Applications) and ASTM F562 (Standard Specification for Wrought 35Cobalt-35Nickel-20Chromium-10Molybdenum Alloy for Surgical Implant Applications).

Pattern Generation

According to certain aspects of the present invention, portions of the work-piece may be etched, such as in a pattern. Those portions that are to remain un-etched may be protected from the chemical etching composition using a masking material. Masking materials may include at least coatings applied to the surfaces to be protected, such as coatings resistant to the chemical etching composition. The exposed, non-masked surfaces may then be chemically etched by exposure to the chemical etching compositions of the present invention.

Coatings resistant to the chemical etching composition, and the activation solution (mineral acid) may be applied by any means known in the art, such as at least dipping, pouring, spraying, brushing, or rolling. Exemplary coatings resistant to the chemical etching compositions of the present invention include, for example, maskants from AC Products, such as ADCOAT AC-818.

Depending on the solids content of the selected coating, multiple applications of the coating may be necessary, allowing for sufficient drying time between applications. The coatings used are generally customized to protect the object from the selected etchant while avoiding any harm to the underlying material of the object.

After each application, the coating may be allowed to cure in a manner which prevents damage to the preceding application, and/or which does not inhibit future applications. The term "cure", as used in connection with a cured coating, means that at least a portion of the components that form the coating are polymerized, cross-linked, or dried to form a hardened film. Curing or drying reactions to form the hardened film may be carried out under ambient conditions, or may be carried out at elevated temperatures, pressures, or in the presence of various gases. For example, the coating may comprise a solvent which may be evaporated to dry or cure the coating. The solvent evaporation may be accelerated by vacuum removal coupled with fresh air or inert gas supply. Depending upon the nature of the chosen coating, heat sources may be used to accelerate drying. Further, for certain coating chemistries, additional processing steps (imaging, hardening, fixing, etc.) may be necessary to make the coating fully resistant to the targeted etching composition.

The coating may be applied in a pattern that exposes the regions of the work-piece to be etched and covers the regions to be protected. Alternatively, the coating may be patterned to remove those regions of the coating that are to be etched on the work-piece. Such removal may be via mechanical scribing and peeling, or by laser ablation, wherein a laser is utilized to remove or ablate the coating in specific regions or patterns. In both cases, a thickness of the coating may be matched to the characteristics of the scribing or laser ablation equipment. In general, the thinnest application that allows for full protection during the chemical etching step is desired, as thinner coatings require less drying time, less coating material, lower laser intensities, and less time stripping the coating after etching is complete. Moreover, for laser ablation processes, colorants or other additives may be added to the coating to improve the ablation process. The colorants and/or additives may be matched to the specific laser type and wavelength.

For work-pieces which are to be patterned using a photoresist, the photoresist may be applied to the surface of the work-piece. Photoresist is a photosensitive coating that changes properties when exposed to light, either gaining or losing resistance to attack by an etchant or solvent in the areas exposed to electromagnetic radiation, most commonly in the UV light spectrum. The thickness and properties of the photoresist (e.g., positive or negative photoresist) may be matched to the equipment used for exposure of the pattern onto the photoresist.

While several methods for coating the surface of the work-piece have been described herein, other methods known in the art are within the scope of the present invention. Furthermore, more than one coating layer may be applied to the surface of the work-piece, wherein each coating layer may vary in thickness and identity of the coating material. As previously indicated, selection of the specific coating thickness and coating material may depend on at least the method of pattern generation to be used in future steps of the process.

The term "pattern generation" generally describes various methods and implementations used to remove a portion of the coating from the surface of the work-piece according to a specific pattern or design. The pattern may be preset or programmed into a computer (e.g., translated from CAD drawings) which directs the movements of the various devices used to remove the portion of coating and movements of the work-piece, either together or individually.

The patterned work-piece, whether produced through laser ablation, mechanical scribing and peeling, or by a photo resist process may be exposed to the chemical etching composition using any of dipping, rolling, brushing, or spraying. As indicated hereinabove, if the work-piece is contacted with the chemical etching composition in a bath, the work-piece may be agitated while in the bath, or alternatively, the chemical etching composition may be provided as a flow of material (e.g., the work-piece may be positioned in a stream of the chemical etching composition).

When an activation step is included prior to the chemical etch, the patterned surface may be activated, such as with any of the chemistries disclosed hereinabove. Alternatively, the surface may be activated prior to patterning using any of the methods discussed herein (patterned coating, coating having portions removed, or photoresist).

Moreover, either or both of the work-piece and the chemical etching composition may be heated to a temperature in a range of from about 20° C. to about 100° C., such as from about 30° C. to about 100° C., or from about 40° C. to about 100° C., or from about 50° C. to about 100° C., or from about 60° C. to about 100° C., or from about 65° C. to about 95° C., or from about 80° C. to about 95° C., or from about 82° C. to about 88° C., or from 88° C. to about 91° C.

Once etching is complete, the work-piece may be rinsed clean of all residual etchant and placed in a bath of stripping solution (a solvent matched to the coatings) to remove all remaining coating material. Alternatively, a wet blast process consisting of a high-pressure spray of a solution could be used in place of the stripping solution to mechanically remove the coating from the object. After the remaining coating is removed ("stripping"), the work-piece may be thoroughly washed and dried.

Chemical Etch Characteristics

The amount of material removed by the chemical etching composition, i.e., the depth of the etch, is unlimited and may depend on the amount of exposure time to the chemical etching composition and changes in the chemistry of the composition, e.g., after long exposure times. Such changes can include at least a reduction in the acid content, an increase in the component metals content, or any combination thereof.

The rate of etching, i.e., rate of material removal, may depend on a combination of the proportion of chemical components to one another, the temperature, and/or amount of agitation of the work-piece in the chemical etching composition. For example, according to certain aspects of the presently disclosed methods, a sample of cobalt chrome may be etched at a rate of 0.1 to 1 mil/minute in the presently disclosed chemical etching compositions, such as 0.3 to 1 mil/minutes, or about 0.5 mil/minute, when exposed at room temperature.

The etched surface may display a surface roughness that is at least 25% less than the native, un-etched surface, such as a surface roughness that is at least 40% less, or at least 50% less, or at least 60% less, or at least 70% less, or at least 80% less, or even at least 90% less than the native, un-etched surface. The etched surface may have a surface roughness (Ra) that is less than 200 μ-in, or less than 150 μ-in, or even less than 100 μ-in (less than 5 μm, 3.8 μm, or 2.5 μm, respectively).

One unique and unexpected quality of the present chemical etching compositions and methods of use is that the final surface, after the chemical etching is completed, does not include any directionally oriented etch markings or "scratches". As discussed above, prior art methods for smoothing surfaces on alloys such as those disclosed herein include abrasive flow machining or smoothing. Such methods force a viscous liquid comprising abrasive material past the surface to be smoothed at high flow rates. The directionality of the flow of abrasive material leads to directionally oriented scratches or marks. Thus, while this process may provide smooth surfaces, albeit at increased time and cost compared to the presently disclosed compositions and methods, the surfaces include directionally oriented marks.

Another unique and unexpected quality of the present chemical etching compositions and methods of use is that the final surface, after the chemical etching is completed, is a passivated surface. That is, it is generally not possible to perform the etching process a subsequent time. Alternate chemistries, such as the activation chemistries disclosed hereinabove, and/or mechanical polishing or abrasion may be used to expose more of the underlying surface (i.e., non-passivated surface) in preparation for a subsequent round of chemical etching using the chemical etching compositions of the present invention.

Passivation may be useful to achieve complex patterning of a surface, where certain areas that are protected during a first round of etching, may be uncoated and etched during a second round of etching to a depth different than the depth of etching achieved during the first round of etching. Such a process may be used to achieve any number of varied depths in a substrate over any number of coating and etching processes. In addition, the resultant surface may be expected to exhibit an even higher degree of corrosion resistance at elevated temperatures that the pre etch base alloy.

Moreover, the present inventors have found that the chemical etching compositions and methods of use thereof provide for unlimited chemical etching or milling of the surface (e.g., depth, total area, etc.) in a single etching process.

This stable surface layer, when present, may be beneficial for enhanced corrosion potential beyond that of standard cobalt-chrome-moly surfaces, and further reduce toxicity beyond standard alloys when implanted as in an orthopedic device.

EXAMPLES

The following examples provide formulations that may be used to etch various cobalt chromium alloys. Before each of the chemical etching steps listed in these examples, the alloy material is activated. Exemplary activation steps that form part of the presently disclosed methods include exposure of the alloy material to a mineral acid just prior to exposure to the chemical etching compositions, such as by submerging or spraying the alloy material with the mineral acid just prior to exposure to the chemical etching compositions disclosed herein. For example, the work-piece may be dipped in or sprayed with a 10% to 100% (v/v) aqueous solution of hydrochloric acid and within several minutes, such as less than 120 seconds, or even 30 seconds, exposed to one of them chemical etching solutions as detailed below in Examples I-III. While the activation solution is specifically indicated herein to comprise hydrochloric acid, other mineral acids or mixtures thereof would provide substantially the same results. Additionally, certain alloys, such as forged cobalt chromium alloys, may benefit from different activation solutions, such as mixtures of concentrated hydrochloric acid and hydrogen peroxide.

Because it is preferred to expose the work-piece to the chemical etch composition within a short time after exposure to the activation solution, such as when the work-piece is still wet with the activation solution, it may be beneficial to apply any coatings or patterning before the activation step. As such, if the work-piece is to be patterned, such as by including of a coating to protect certain portions or surfaces of the work-piece, that coating may be applied before the surface is activated and/or etched.

Example I

An exemplary chemical etching composition for the chemical dissolution of CoCr alloys according to certain aspects of the presently disclosed invention include constituents and amounts as shown in Table I.

The etching temperature ranges useful for the above compositions include about 20° C. to about 100° C., such as from about 82° C. to about 88° C.

While CoCr can be etched at many (or all) combinations of chemistry within the ranges above, at the preferred set-point conditions, uniform removal of material at up to 0.015 inches and beyond was achieved with no measurable IGA, making it a suitable composition for flight-critical aerospace components.

TABLE I

| Component | Range | Set-Point |
| --- | --- | --- |
| Iron (Fe) | 50-225 g/l | 115 g/l |
| Cobalt (Co) | 0-10 g/l | 0.2 g/l |
| Chromium (Cr) | 1-10 g/l | 3.3 g/l |
| Molybdenum (Mo) | 0.1-5 g/l | 1.2 g/l |
| Hydrochloric Acid (HCl) | 2-5N | 4.0N |
| Nitric Acid (HNO$_3$) | 0.05-0.8N | 0.5N |
| Hydrofluoric Acid (HF) | 0.6-1.3N | 1.0N |

Example II

An exemplary inventive high-iron composition for etching CoCr alloys is shown in Table II. This composition was found to provide surface roughness (Ra) improvements from a starting condition of approximately 400 μ-in (about 10 micrometer, μm) to a finished condition of approximately 125 μ-in (about 3 μm), with a surface material removal of 0.005 inches.

TABLE II

| Component | Range | Set-Point |
| --- | --- | --- |
| Iron (Fe) | 50-225 g/l | 175 g/l |
| Cobalt (Co) | 0-10 g/l | 5 g/l |
| Chromium (Cr) | 1-10 g/l | 3 g/l |
| Molybdenum (Mo) | 0.1-5 g/l | 0.5 g/l |
| Hydrochloric Acid (HCl) | 2-5N | 4.5N |
| Nitric Acid (HNO$_3$) | 0.05-0.8N | 0.11N |
| Hydrofluoric Acid (HF) | 0.6-1.3N | 0.9N |

Example III

An exemplary inventive iron-free, high-metals composition for etching CoCr alloys is shown in Table III. The composition was found to provide surface roughness (Ra) improvements from a starting condition of approximately 250 μ-in (about 6.4 μm) to a finished condition of approximately 70 μ-in (less than 2 μm), with a surface material removal of 0.005 inches.

TABLE III

| Component | Range | Set-Point |
| --- | --- | --- |
| Iron (Fe) | 0 g/l | 0 g/l |
| Cobalt (Co) | 7-355 g/l | 81.7 g/l |
| Chromium (Cr) | 3-170 g/l | 35.8 g/l |
| Molybdenum (Mo) | 1-40 g/l | 7.5 g/l |
| Hydrochloric Acid (HCl) | 2-5N | 4.5N |
| Nitric Acid (HNO$_3$) | 0.05-0.8N | 0.11N |
| Hydrofluoric Acid (HF) | 0.6-1.3N | 0.9N |

The high metals chemical etch composition shown in Table III provides a ratio of metals in solution that is at or near the ratio of the elemental components in the starting alloy, cobalt chromium molybdenum ASTM F75, and resulted in dramatic improvement in surface condition. Thus, the present inventors have found that increased metal concentrations improve the surface roughness, i.e., provides a smoother surface, exponentially up to the point of saturation. Higher concentrations were found to decrease the rate of etch (i.e., as the metals concentrations rise, the rate of etching will begin to decrease, potentially making the processing of parts at or near full saturation impractical from a processing time standpoint).

Superior surface results with increasing metals at the ratios native to the original alloy is an important finding as it provides a processing composition that does not require the addition of non-native metals or metal salts. That is, the composition can be concentrated in metals for improved surface finish simply by etching more material while maintaining the appropriate acid concentrations. This greatly aids process control (i.e., the metals will always drift towards the alloy concentrations with increased usage) and eliminates the need for non-native metals addition, namely iron salts, which represents substantial processing costs in a production setting (e.g., iron solutions need to be made in an inert environment to prevent oxidization of the iron; iron solutions are generally expensive).

Thus, a preferred chemical etching composition for aerospace applications, or any application trying to achieve uniform removals with improved surface finish, includes high concentrations of native metals, up to saturation, at the elemental ratios (i.e., native ratios) present in the material of the parts being etched.

It should be noted that nitric acid concentrations are relatively low for these compositions as high metals may lead to rapid breakdown of the nitric acid when that acid is present in higher concentrations.

As indicated, the chemical etch compositions of the presently disclosed invention provide uniform material removal of up to 0.015" and beyond with no measurable IGA, making them suitable compositions for etching flight critical aerospace components.

Exemplary aerospace or aircraft components that may benefit from the compositions and methods of the presently disclosed invention include at least aircraft skin and fuselage skin and architectural trims. For example, according to certain aspects, the alloys etched by the compositions and methods presently disclosed may for a component, in part or wholly, of an aerospace vehicle. As such, the component may be an aerospace component attachable or forming part of an aerospace vehicle or device.

Shown in FIGS. 1A-1F are micrographs of an unetched native cobalt chromium alloy at 150× and 1000× magnification (FIGS. 1A and 1B, respectively) compared with a cobalt chromium alloy surface that has been etched with a composition according to the present disclosure, with 2 mil surface removed (50 microns removed shown at 150× and 1000×magnification in FIGS. 1C and 1D, respectively) and with 12 mil surface removed (300 microns removed shown at 150× and 1000× magnification in FIGS. 1E and 1F, respectively). Note that the native surface includes deep crevices into which the dye may fill or adhere in a dye penetrant test, and how the etched surfaces according to the present invention lack these crevices.

Figure 2B:
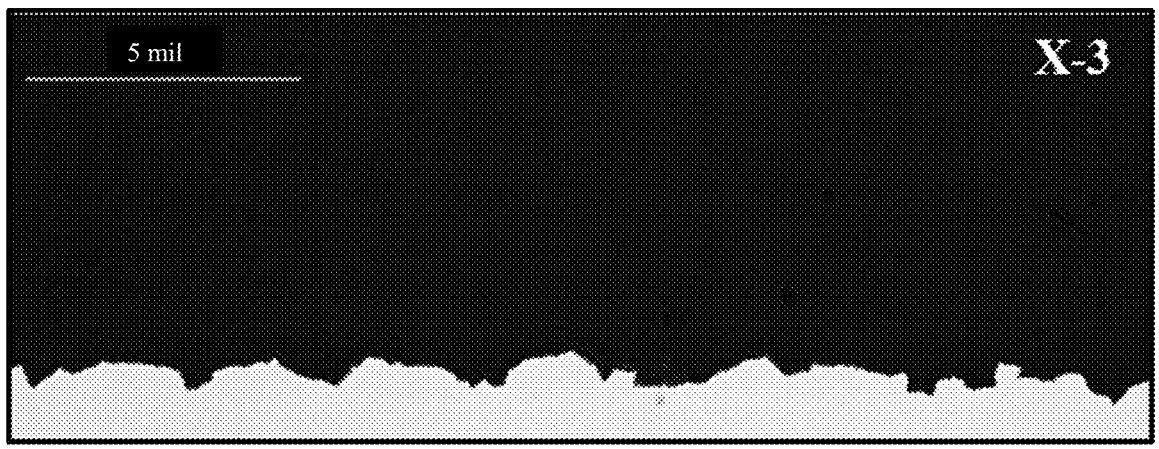
Figure 2C:

Micrographs of surfaces etched using the compositions and methods of the presently disclosed invention are shown in FIGS. 2A-2C, wherein the smoother surface of FIG. 2A was obtained with an etching composition comprising higher concentrations of the metals (i.e., as disclosed in the second embodiment of the etching composition). Note that none of the exemplary surfaces show directional surface scratches or markings (i.e., no extended grooves).

Aspects of the Invention

The presently disclosed invention provides the following aspects:

Aspect 1: A composition for etching a cobalt chromium alloy, the composition comprising: at least two mineral acids; certain or all of the main component metals of the cobalt chromium alloy; and optionally iron (Fe).

Aspect 2: The comparison according to aspect 1, wherein the composition comprises: at least two mineral acids; chromium (Cr); molybdenum (Mo); optionally iron (Fe); and optionally, cobalt (Co).

Aspect 3: The composition according to aspects 1 or 2, wherein the at least two mineral acids are selected from hydrochloric acid (HCl), nitric acid (HNO$_3$), sulfuric acid (H$_2$SO$_4$), and hydrofluoric acid (HF).

Aspect 4: The composition according to any one of aspects 1 to 3, wherein the at least two mineral acids comprise hydrochloric acid (HCl), nitric acid (HNO$_3$), and hydrofluoric acid (HF).

Aspect 5: The composition according to any one of aspects 1 to 4, comprising: 2N-5N hydrochloric acid (HCl); 0.05N-0.8N nitric acid (HNO$_3$); and 0.6N-1.3N hydrofluoric acid (HF).

Aspect 6: The composition according to any one of aspects 1 to 5, comprising: 1-10 g/l Chromium (Cr); 0.1-5 g/l molybdenum (Mo); 0-225 g/l Iron (Fe); and 0-10 g/l cobalt (Co).

Aspect 7: The composition according to any one of aspects 1 to 6, comprising: 50-225 g/l Iron (Fe); 1-10 g/l chromium (Cr); 0.1-5 g/l molybdenum (Mo); and 0-10 g/l cobalt (Co).

Aspect 8: The composition according to any one of aspects 1 to 7, comprising: 2N-5N hydrochloric acid (HCl); 0.05N-0.8N nitric acid (HNO$_3$); 0.6N-1.3N hydrofluoric acid (HF); 0-225 g/l Iron (Fe); 1-10 g/l chromium (Cr); 0.1-5 g/l molybdenum (Mo); and 0-10 g/l cobalt (Co).

Aspect 9: The composition according to aspect 8, comprising: 50-225 g/l Iron (Fe).

Aspect 10: The composition according to any one of aspects 1 to 9, wherein the composition etches cobalt chromium alloys at a rate of 0.1 to 1.0 mil/minute.

Aspect 10: The composition according to any one of aspects 2 to 5, comprising: 7-355 g/l cobalt (Co); 3-170 g/l chromium (Cr); and 1-40 g/l molybdenum (Mo).

Aspect 11: The composition according to any one of aspects 2 to 5, wherein the Co, Cr, and Mo are provided in a ratio that is the same as a native ratio of each metal in the cobalt chromium alloy.

Aspect 12: A composition for etching cobalt chromium alloys, the composition comprising: 2N-5N hydrochloric acid (HCl); 0.05N-0.8N nitric acid (HNO$_3$); 0.6N-1.3N hydrofluoric acid (HF); 7-355 g/l cobalt (Co); 3-170 g/l chromium (Cr); and 1-40 g/l molybdenum (Mo).

Aspect 13: A method for etching an alloy material, the method comprising: preparing an aqueous chemical etching composition comprising: at least two mineral acids, chromium (Cr), molybdenum (Mo), optionally, iron (Fe), and optionally, cobalt (Co); and contacting the alloy material with the aqueous chemical etching composition.

Aspect 14: The method according to aspect 13, wherein the aqueous chemical etching composition comprises: 2N-5N hydrochloric acid (HCl); 0.05N-0.8N nitric acid (HNO$_3$); 0.6N-1.3N hydrofluoric acid (HF); 50-225 g/l Iron (Fe); 1-10 g/l chromium (Cr); 0.1-5 g/l molybdenum (Mo); and 0-10 g/l cobalt (Co).

Aspect 15: The method according to aspect 13, wherein the aqueous chemical etching composition comprises: 2N-5N hydrochloric acid (HCl); 0.05N-0.8N nitric acid (HNO$_3$); 0.6N-1.3N hydrofluoric acid (HF); 7-355 g/l cobalt (Co); 3-170 g/l chromium (Cr); and 1-40 g/l molybdenum (Mo).

Aspect 16: The method according to any one of aspects 13 to 15, wherein the alloy material is a cobalt chromium alloy.

Aspect 16: The method according to any one of aspects 13 to 15, further comprising, before the step of contacting the alloy material with the aqueous chemical etching composition, activating the alloy material to be etched with an activation solution.

Aspect 17: The method according to aspect 16, wherein the activating step is carried out immediately before the contacting step, such as within 120 seconds.

Aspect 18: The method according to aspects 16 or 17, wherein the activation solution comprises a concentrated mineral acid, such as a 10% to 100% aqueous solution of hydrochloric acid or hydrofluoric acid (v/v), or a mixture of concentrated mineral acid and hydrogen peroxide, such as concentrated hydrochloric acid and hydrogen peroxide.

Aspect 19: A method for etching a cobalt chromium alloy work-piece, the method comprising: contacting the work-piece with a chemical etching composition according to any one of aspects 1 to 12 at a temperature of from about 20° C. to about 100° C., wherein the work-piece is agitated in the chemical etching composition for a time period of 1 minute to 200 minutes.

Aspect 20: The method according to aspect 19, wherein, before the contacting step, the method comprises: applying a coating which resists chemical etchants to the work-piece; and removing a portion of the coating to form a patterned design in the coating on the work-piece.

Aspect 21: The method according to aspect 19 or 20 wherein, before the contacting step, the method comprises: applying an activation solution.

Aspect 22: The method according to aspect 20 wherein the step of applying the activation solution is carried out immediately before the contacting step, such as within 120 seconds.

Aspect 23: The method according to aspect 21 or 22, wherein the activation solution comprises a 10% to 100% aqueous solution of a mineral acid, such as hydrochloric acid (v/v), or a mixture of concentrated hydrogen peroxide and concentrated hydrochloric acid, such as at least 25% (v/v) 50% hydrogen peroxide and at least 25% (v/v) fuming hydrochloric acid.

Aspect 24: The method according to any one of aspects 20 to 23, wherein, after the contacting step, the method comprises: stripping the coating from the work-piece.

Aspect 25: A work-piece produced by the method according to any one of aspects 13 to 24, having a surface roughness (R$_a$) of less than 200 μ-in, such as less than 150 μ-in, or less than 100 μ-in.

Aspect 26: The work-piece according to aspect 25, wherein the work-piece forms a component, in part or wholly, of an aerospace vehicle.

Aspect 27: A work-piece formed of a cobalt chromium alloy having a surface roughness (R$_a$) of less than 200 μ-in and no directional surface scratches.

Aspect 28: The work-piece of aspect 27, wherein the surface roughness (R$_a$) is less than 100 μ-in, and wherein the work-piece forms at least a portion of a component part of an aerospace vehicle.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A composition for etching a cobalt chromium alloy, the composition comprising:
   hydrochloric acid (HCl), 0.05N-0.8N nitric acid (HNO$_3$), and hydrofluoric acid (HF); and
   component metals of the cobalt chromium alloy, the component metals comprising at least 3 g/l chromium (Cr), and at least 0.5 g/l molybdenum (Mo),
   wherein the composition etches cobalt chromium alloys at a rate of 0.1 to 1.0 mil/minute.

2. The composition of claim 1, comprising:
   0.6N-1.3N hydrofluoric acid (HF).

3. The composition of claim 1, wherein the component metals comprise:
   3-10 g/l Chromium (Cr); and
   0.5-5 g/l molybdenum (Mo).

4. The composition of claim 3, further comprising:
   50-225 g/l Iron (Fe).

5. The composition of claim 1, wherein the component metals comprise at least 1 g/l cobalt (Co).

6. The composition of claim 5, comprising:
   7-355 g/l cobalt (Co);
   3-170 g/l chromium (Cr); and
   1-40 g/l molybdenum (Mo).

7. The composition of claim 1, comprising:
   at least 2N hydrochloric acid (HCl);
   0.05N-0.8N nitric acid (HNO$_3$);
   0.6N-1.3N hydrofluoric acid (HF);
   50-225 g/l Iron (Fe);
   1-10 g/l chromium (Cr); and
   0.1-5 g/l molybdenum (Mo).

8. The composition of claim 1, comprising:
   at least 2N hydrochloric acid (HCl);
   0.05N-0.8N nitric acid (HNO$_3$);
   0.6N-1.3N hydrofluoric acid (HF);
   7-355 g/l cobalt (Co);
   3-170 g/l chromium (Cr); and
   1-40 g/l molybdenum (Mo).

9. A method for etching a cobalt chromium alloy work-piece, the method comprising:
   contacting at least one surface of the work-piece with the chemical etching composition of claim 1,
   wherein the contacting step is carried out at a temperature of 20° C. to 100° C. for a time period of 1 minute to 200 minutes, and
   wherein the composition etches a surface of the cobalt chromium alloy work-piece at a rate of 0.1 to 1.0 mil/minute.

10. The method of claim 9, wherein the chemical etch composition comprises:
    0.6N-1.3N hydrofluoric acid (HF).

11. The method of claim 10, wherein the component metals comprise:
    3-10 g/l Chromium (Cr); and
    0.5-5 g/l molybdenum (Mo).

12. The method of claim 11, further comprising:
    50-225 g/l Iron (Fe).

13. The method of claim 10, wherein the component metals comprise at least 1 g/l cobalt (Co).

14. The method of claim 13, wherein the component metals comprise:
    7-355 g/l cobalt (Co);
    3-170 g/l chromium (Cr); and
    1-40 g/l molybdenum (Mo).

15. The method of claim 9, further comprising, before the step of contacting the work piece with the chemical etching composition:
    activating the at least one surface of the work-piece with an activation solution comprising a 10% to 100% (v/v) aqueous solution of a mineral acid.

16. The method of claim 15, wherein the contacting step is carried out within 120 seconds of the activating step.

17. The method of claim 9, wherein, before the contacting step, the method comprises:
    applying a coating which resists chemical etchants to the work-piece; and
    removing a portion of the coating to form a patterned design in the coating on the work-piece.

18. The method of claim 17, wherein, after the contacting step, the method comprises:
    stripping the coating from the work-piece.

19. A composition for etching a cobalt chromium alloy, the composition comprising:
    hydrochloric acid (HCl), nitric acid (HNO$_3$), and 0.6N-1.3N hydrofluoric acid (HF); and
    component metals of the cobalt chromium alloy, the component metals comprising at least 3 g/l chromium (Cr), and at least 0.5 g/l molybdenum (Mo).

20. The composition of claim 19, comprising:
    0.05N-0.8N nitric acid (HNO$_3$).

* * * * *